United States Patent
Li et al.

(10) Patent No.: US 10,308,195 B2
(45) Date of Patent: Jun. 4, 2019

(54) FASTENER ASSEMBLY FOR INTERIOR TRIM IN A VEHICLE

(71) Applicant: Ford Global Technologies LLC, Dearborn, MI (US)

(72) Inventors: Tina Li, Nanjing (CN); Yong Gao, Nanjing (CN); Lillian Long, Nanjing (CN); Yalin Zhang, Nanjing (CN)

(73) Assignee: Ford Global Technologies LLC, Dearborn, MI (US)

( * ) Notice: Subject to any disclaimer, the term of this patent is extended or adjusted under 35 U.S.C. 154(b) by 78 days.

(21) Appl. No.: 15/697,869

(22) Filed: Sep. 7, 2017

(65) Prior Publication Data

US 2018/0099624 A1 Apr. 12, 2018

(30) Foreign Application Priority Data

Oct. 12, 2016 (CN) .......................... 2016 1 0892541

(51) Int. Cl.
*B60R 13/02* (2006.01)
*F16B 21/07* (2006.01)
*F16B 5/12* (2006.01)
*F16B 5/06* (2006.01)
*F16B 21/08* (2006.01)

(52) U.S. Cl.
CPC ........ *B60R 13/0206* (2013.01); *F16B 5/0657* (2013.01); *F16B 5/0664* (2013.01); *F16B 5/126* (2013.01); *F16B 21/071* (2013.01); *F16B 21/073* (2013.01); *F16B 21/075* (2013.01); *F16B 21/086* (2013.01)

(58) Field of Classification Search
CPC .. B60R 13/0206; F16B 5/0657; F16B 5/0667; F16B 5/126; F16B 21/071; F16B 21/073; F16B 21/075; F16B 21/086; F16B 21/02
See application file for complete search history.

(56) References Cited

U.S. PATENT DOCUMENTS

| 4,850,773 A | 7/1989 | Asami |
| 4,890,966 A | 1/1990 | Umezawa |
| 6,039,523 A | 3/2000 | Kraus |
| 7,207,758 B2 * | 4/2007 | Leon ........................ F16B 21/02 |
| | | 411/45 |
| 7,267,385 B2 | 9/2007 | Williams et al. |
| 2002/0094253 A1 * | 7/2002 | Enomoto ............ F16B 19/1081 |
| | | 411/41 |

FOREIGN PATENT DOCUMENTS

| JP | H0512222 U | 2/1993 |
| KR | 20010060525 A | 7/2001 |

* cited by examiner

*Primary Examiner* — Robert Sandy
(74) *Attorney, Agent, or Firm* — Vichit Chea; Kolitch Romano LLP

(57) ABSTRACT

A fastener assembly for an interior trim part in a vehicle is provided. The fastener assembly includes a fixed element and a movable element. The fixed element includes a base panel with a through hole and a plurality of engaging parts extending from a surface of the base panel, and the engaging parts are flexible and deformable towards or away from a central axis of the through hole. The movable element includes a flange and an engaging shaft extending from a surface of the flange, and the engaging shaft passes through the through hole of the fixed element to be engaged with the engaging parts at a fixed position.

20 Claims, 10 Drawing Sheets

FASTENER ASSEMBLY FOR INTERIOR TRIM IN A VEHICLE

RELATED APPLICATION

This application claims the benefit of Chinese Patent Application No.: CN 201610892541.9, filed Oct. 12, 2016, the entire contents thereof being incorporated herein by reference.

FIELD

The present disclosure relates to fastening devices in a vehicle, more particularly to a fastener assembly for an interior trim in a vehicle.

BACKGROUND

A vehicle includes various kinds of interior trim parts, and thus a plurality of fasteners are provided to fix an interior trim part (e.g., an interior trim panel of a vehicle door) to sheet metal of the vehicle. The fasteners are usually threaded bolts which pass through mounting holes in the interior trim part to be engaged with threaded holes in the metal sheet to fix the interior trim part to the metal sheet. In some assembling process, the interior trim parts, the metal sheet, and the threaded bolts are delivered independently by different suppliers to an assembly line of the vehicle. When assembling a vehicle door, an operator needs to mount the interior trim part to the sheet metal first and then mount the bolt. Such operation process is complicated. Further, the suppliers need to package and transport multiple parts. Furthermore, the bolts are commonly mounted using a screw which requires the corresponding mounting hole to have a size larger than that of the bolt for the operation. The larger mounting hole has less appealing appearance and will cause high manufacturing cost because additional materials are required to cover the mounting hole. Moreover, removal of the bolt also needs the use of a screw gun, which complicates the operation, and is inconvenient for following maintenance or replacement. Thus, there is need for a fastener to address some of the issues mentioned above.

SUMMARY

The present disclosure provides a fastener assembly for an interior trim part in a vehicle to at least address some of the issues described above. The fastener assembly has a simple structure which results in better stability and aesthetic appearance. Further, the fastener assembly is easy to be assembled, low in manufacturing cost, and convenient for maintenance and replacement.

According to one aspect of the present disclosure, a fastener assembly is provided. The fastener assembly includes a fixed element and a movable element. The fixed element includes a base panel with a through hole and a plurality of engaging parts extending from a surface of the base panel, and the engaging parts are flexible and deformable towards or away from a central axis of the through hole. The movable element includes a flange and an engaging shaft extending from a surface of the flange, and the engaging shaft passes through the through hole of the fixed element to be engaged with the engaging parts at a fixed position.

In some embodiments, the engaging shaft includes a guiding part, and the guiding part may be engaged with the engaging parts of the fixed element at the fixed position, and guide the engaging parts to move to be released from the engaging shaft when the movable element rotates about a central axis thereof along a first direction.

In some embodiments, the engaging shaft further includes a shaft body extending from the surface of the base panel and a head on the shaft body, and the head has a diameter larger than that of the shaft body. The guiding part is disposed between the shaft body and the head, and a diameter of the guide part is gradually decreased in a direction from the head to the shaft body and has a guiding groove. The engaging parts are engaged with a lower end of the guiding part at the fixed position, and the engaging parts are guided by the guiding groove to move to an upper end of the guiding part as the movable part rotates such that the engaging parts is released from the engaging shaft.

In some embodiments, the guiding part has an inclined threaded section with grooves extending along its exterior peripheral.

In some embodiments, the engaging parts are formed with flexible metal sheets.

In some embodiments, each of the engaging parts has an upright portion extending substantially perpendicularly from the surface of the base panel and a free portion extending from the vertical part towards the central axis of through hole of the base panel.

In some embodiments, at least two of the engaging parts have two free portions overlapped with each other in a normal state of the fixed element.

In some embodiments, at least two of the engaging parts have two free portions with a distance smaller than a smallest outer diameter of the engaging shaft.

In some embodiments, the head of the engaging shaft has a cone or truncated cone shape.

In some embodiments, the fixed element is made from metal and is integrally formed, and the movable element is made from metal and integrally formed.

According to another aspect of the present disclosure, a fastener assembly for connecting an interior trim part of a vehicle to a sheet metal of the vehicle is provided. The fastener assembly includes a fixed element and a movable element. The fixed element includes a base panel having a through hole and a plurality of engaging parts extending from an outer peripheral of the through hole on the base panel. The engaging parts may pass through a mounting hole formed in the sheet metal to be retained on the sheet metal, and be flexible to bend towards or away from a central axis of the through hole. The movable element has at least a flange and an engaging shaft extending from a surface of the flange. The engaging shaft may pass through a mounting hole in the interior trim part, a through hole in the fixed element, the through hole in the sheet metal to be engaged with the engaging parts at a fixed position.

In some embodiments, the engaging shaft includes a guiding part, the guiding part may be engaged with the engaging parts of the fixed element at the fixed position, and guide movement of the engaging parts such that the engaging parts are released from an engagement with the engaging shaft as the movable element rotates about a central axis.

In some embodiments, the engaging shaft further includes a shaft body extending from the surface of the base panel and a head above the shaft body, and the head has a diameter larger than that of the shaft body. The guiding part is disposed between the shaft body and the head, has a diameter gradually decreased in a direction from the head to the shaft body, and has an inclined groove on an outer peripheral thereof. The inclined groove may lock the engaging parts at its lower end at the fixed position, and guide the engaging parts to move to its upper end to release the engaging parts from an engagement with the moveable element as the movable element rotates.

In some embodiments, each of the engaging parts includes an upright portion extending substantially perpendicularly from the surface of the base panel, a free portion extending from the upright portion towards the central axis of the through hole in the base panel, and a flexible support fixed on an outer wall of the upright portion. The flexible support may deform to allow the engaging parts of the fixed element to pass through the mounting hole in the metal sheet and return to a normal state after the engaging parts has passed through the mounting hole, such that the fixed element is retained in the mounting hole of the sheet metal.

In some embodiments, the flexible support has a first end connected with the outer wall of the upright portion and a second end extend away from the upright portion. The second end of the flexible support may bend towards the upright portion to allow the engaging parts pass through the mounting hole and return to the normal state to retain the fixed element in the mounting hole after the passing.

In some embodiments, the second end of the flexible support rests against a surface of the sheet metal at the fixed position.

In some embodiments, the flexible support has two ends connected with the outer wall of the upright portion and a flexible connection section between the two ends. The connection section may bend towards the upright portion to allow the engaging parts of the fixed elements to pass through the mounting hole in the sheet metal, and return to the normal state to retain the fixed element in the mounting hole of the sheet metal.

In some embodiments, the fixed element includes a sleeve part disposed around a peripheral of the through hole and extending from the surface of the base panel at a certain distance, and the engaging shaft of the moveable element is partially received in the sleeve part.

In some embodiments, the flange includes a first flange adjacent to the engaging shaft, a second flange opposite to the first flange, and a connection shaft connected between the first and second flanges. The engaging shaft extends from an upper surface of the first flange, and the mounting hole in the interior trim part has an opening at its one side. The connection shaft may be assembled in the mounting hole of the interior trim part via the opening, and the interior trim pan is fixed between the first and second flanges via interference fit.

In some embodiments, the movable part further includes a threaded section disposed between the engaging shaft and the flange, and the mounting hole of the interior trim part has a threaded hole portion corresponding with the threaded section. The threaded section is received in the threaded hole section at the fixed position, and the movements between the threaded section and the threaded hole section provide a downward force to facilitate the disengagement of the engaging shaft and the engaging parts as the movable element rotates about a central axis.

In some embodiments, the fastener assembly further includes a connection part disposed in the mounting hole of the interior trim part at the fixed position, the threaded hole section is formed in and extending through the connection part, and the threaded section is received in the threaded hole section at the fixed position.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

The above advantages and other advantages, and features of the present description will be readily apparent from the following detailed description when taken alone or in connection with the accompanying drawings.

DETAILED DESCRIPTION

Embodiments of the present disclosure are described herein. It is to be understood, however, that the disclosed embodiments are merely examples and other alternative embodiments can take various forms. The figures are not necessarily to be drawn in scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A vehicle generally includes various different fasteners or fastening assemblies to fix an interior trim part to sheet metal of a body or other part of the vehicle. The fasteners or fastening assemblies are required not only to engage with the sheet metal to robustly fasten the interior trim part but also to be easily mounted and dismounted.

Figure 1:
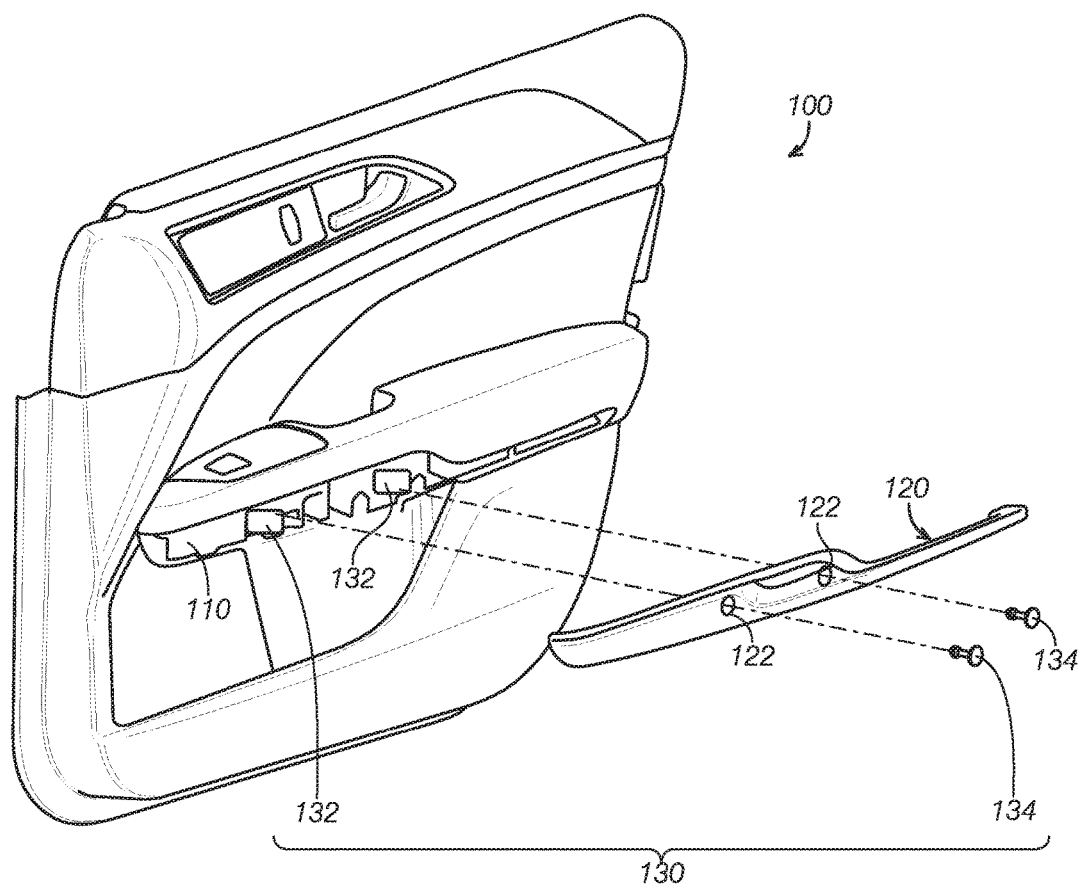
FIG. 1 is a perspective exploded view of a door in a vehicle, illustrating an interior trim part, and a fastening device according to an embodiment of the present disclosure.

FIG. 1 is a perspective view of a door 100 in a vehicle according to an embodiment of the disclosure, illustrating a fastener assembly 130 in the vehicle. The door 100 includes a sheet metal 110, an interior trim part 120, and a plurality of fastening assemblies 130. Each fastener assembly 130 includes a fixed element 132 and a movable element 134. The fixed element 132 may be connected or fixed with the sheet metal 110, and the movable element 134 may pass through a mounting hole 122 in the interior trim part 120 to engage with the fixed element to secure the interior trim part 120 on the sheet metal 110.

In some embodiments, as shown in FIG. 1, the sheet metal 110 may be an inner metal panel of the door facing a passenger compartment of the vehicle, also referred to as inner metal sheet or inner metal panel of the door 100. The interior trim part 120 may be an interior trim panel of the door 100 and have two mounting holes 122. The fixed element 132 of the fastener assembly 130 may be fixed on a predetermined location of the metal sheet 110, while movable element 134 of the fastener assembly 130 may pass through the mounting hole 122 in the interior trim part 120 to secure the interior trim part 120 on the sheet metal 110. In some embodiments, the fixed element 132 may be pre-mounted on the sheet metal 110 and the movable element 134 may be pre-mounted on the interior trim part 120, and all of them can be delivered to an assembly line together. During an assembling process, the interior trim part 120 mounted with the movable elements 122 may be pushed towards the sheet metal 110 mounted with the fixed element 132, such that the movable element 122 may be engaged with the fixed element 132 to fasten the interior trim part 120 and the sheet metal 110. In this way, the transportation and mounting or assembling process of the door 100 of the vehicle may be simplified. Although the door 100 in FIG. 1 is shown as having two fastening assemblies 130, the number of the fastening assemblies 130 is not limited in the present disclosure, and any number of fastening assemblies used to fix the interior trim part on the sheet metal of a vehicle should be construed as within the scope of the present disclosure. It should be appreciated that the interior trim part disclosed in the present disclosure is not limited to the door trim panel as shown in FIG. 1. The interior trim part includes any other interior trim part of the vehicle, which can be fixed to the sheet metal of the vehicle via the fastener assembly according to embodiments of the present disclosure.

Figure 2:
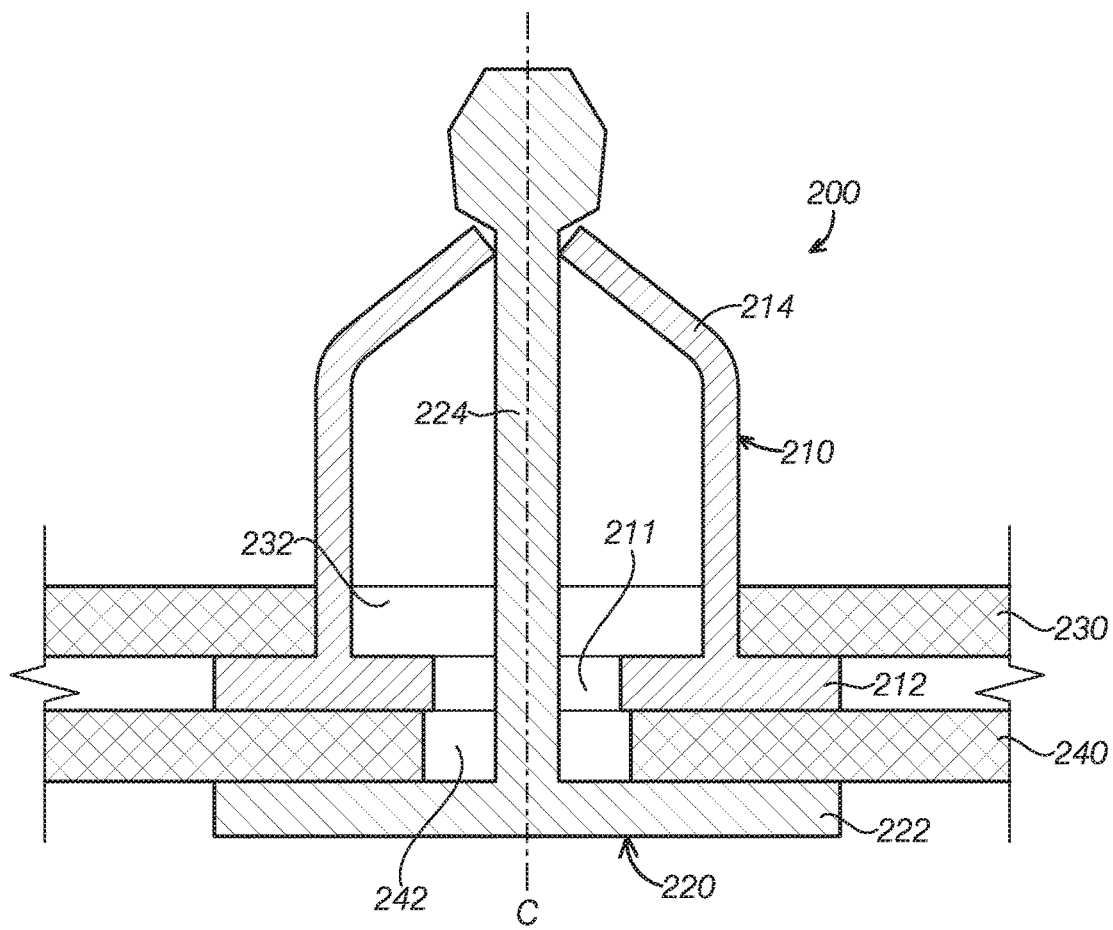
FIG. 2 is a cross-sectional view of a fastener assembly for an interior trim part in a vehicle, illustrating a connection between the interior trim part and a sheet metal of the door.

FIG. 2 is a cross-sectional view of a fastener assembly 200 for an interior trim part 240 in a vehicle according to an embodiment of the present disclosure, illustrating the fastener assembly 200 at a fastened position. The fastener assembly 200 includes a fixed element 210 and a movable element 220 corresponding to the fixed element 210. The fixed element 210 may pass through a mounting hole 232 in the sheet metal 230 of the vehicle to be retained or fixed on the sheet metal 230, the movable element 220 may pass through a through hole 242 in the interior trim part 240 to engage with the fixed element 210 to fix the interior trim part 240 and the sheet metal 230 at the fastening position.

Figure 3:
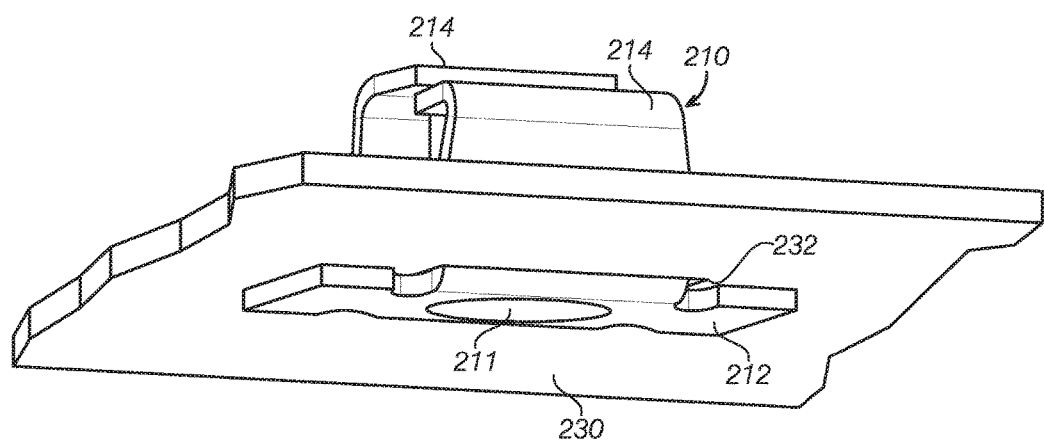
FIG. 3 is a perspective view of a fixed element of the fastener assembly in FIG. 2, illustrating a connection between the fixed element and the sheet metal.

FIG. 3 illustrates the connection between the fixed element 210 and the sheet metal 230 in FIG. 2. In some embodiments, the fixed element 210 may be pre-mounted or preassembled on the sheet metal 230 as shown in FIG. 3. With reference to FIGS. 2 and 3, the fixed element 210 may include a base panel 212 and a plurality of engaging parts 214. The base panel 212 has a through hole 211, the engaging parts 214 extend from an outer peripheral of the through hole 211 on a surface of the base panel 211, and can pass through the mounting hole 232 in the sheet metal 230. As the base panel 212 has a size larger than a diameter of the mounting hole 232, the fixed element 210 may be retained on the sheet metal 230. The engaging parts 214 may move towards or away from a central axis C of the through hole 211. In other words, the engaging parts 214 may be formed from flexible or deformable materials, such as thin metal sheet. The engaging parts 214 are configured to retain the movable element 220 at an assembled status or a fastening position, and moveable in a direction away from the central axis C under an external force to release the movable element 220. In this way, the engagement between the engaging parts 214 and the movable element 220 may be released such that the movable element 220 may be removed from the fixed element 210.

It should be appreciated that, an "assembled status" or "fastened position" may interchangeably refer that the interior trim part and the sheet metal have been connected, locked, or latched via the fastener assembly, or the fixed element and the movable element have been locked with each other. For example, as shown in FIG. 2, at the fastened position, the engaging parts 214 of the fixed element 210 are engaged or locked with the movable element 220 to fix the interior trim part 230 on the sheet metal 220.

It should be appreciated that, although the base panel 212 and the through hole 211 in the base panel 212 in FIG. 3 are shown as rectangle and circular respectively, the shapes of the base panel 212 and the through hole 211 are not limited by the illustrated embodiments. In some embodiments, the base panel 212 may be square, circular, semi-circular, trapezoid, other polygon, or any combinations thereof. As long as either length or width of the base panel 212 is larger than the diameter of the mounting hole 232 of the sheet metal 230, the engaging parts 214 may pass through the mounting hole 232 and secure the fixed element 210 on the sheet metal 230.

In some embodiments, the through hole 211 of the base panel 212 may be rectangular, semi-circular, other polygon, or any combinations thereof. Although the number of the engaging parts 214 is shown as two in FIG. 3 and arranged as two rows to extend in parallel from the surface of the base panel 212, the number of the engaging parts 214 is not limited by the illustrated embodiments. In some embodiments, the fastener assembly may include more than two engaging parts 214, such as three, four, or more. The engaging parts 214 may be arranged as two rows extending in parallel with each other, or distributed evenly along the outer peripheral of the through hole 211 in the base panel 212. In some embodiments, the engaging parts 214 are arranged along the outer peripheral of the through hole 211 and spaced evenly, and cooperate together to clip on the movable element 220.

In some embodiments, each engaging part 214 may include or be formed from flexible or deformable sheet, such as thin metal sheet. The engaging part 214 may be constructed to extend substantially perpendicularly from the surface of the base panel 212 for a distance and then bend towards the central axis C, as shown in FIGS. 2 and 3. In other words, each engaging part 214 may contain an upright portion extending substantially perpendicularly from the base panel 212 and a free portion extending from the upright portion towards the central axis C. The free portion is movable due to its flexibility, such that the distance between the engaging part 214 and the movable element 220 may vary to lock or release the engaging parts 214 and the movable element 220.

Figure 4:
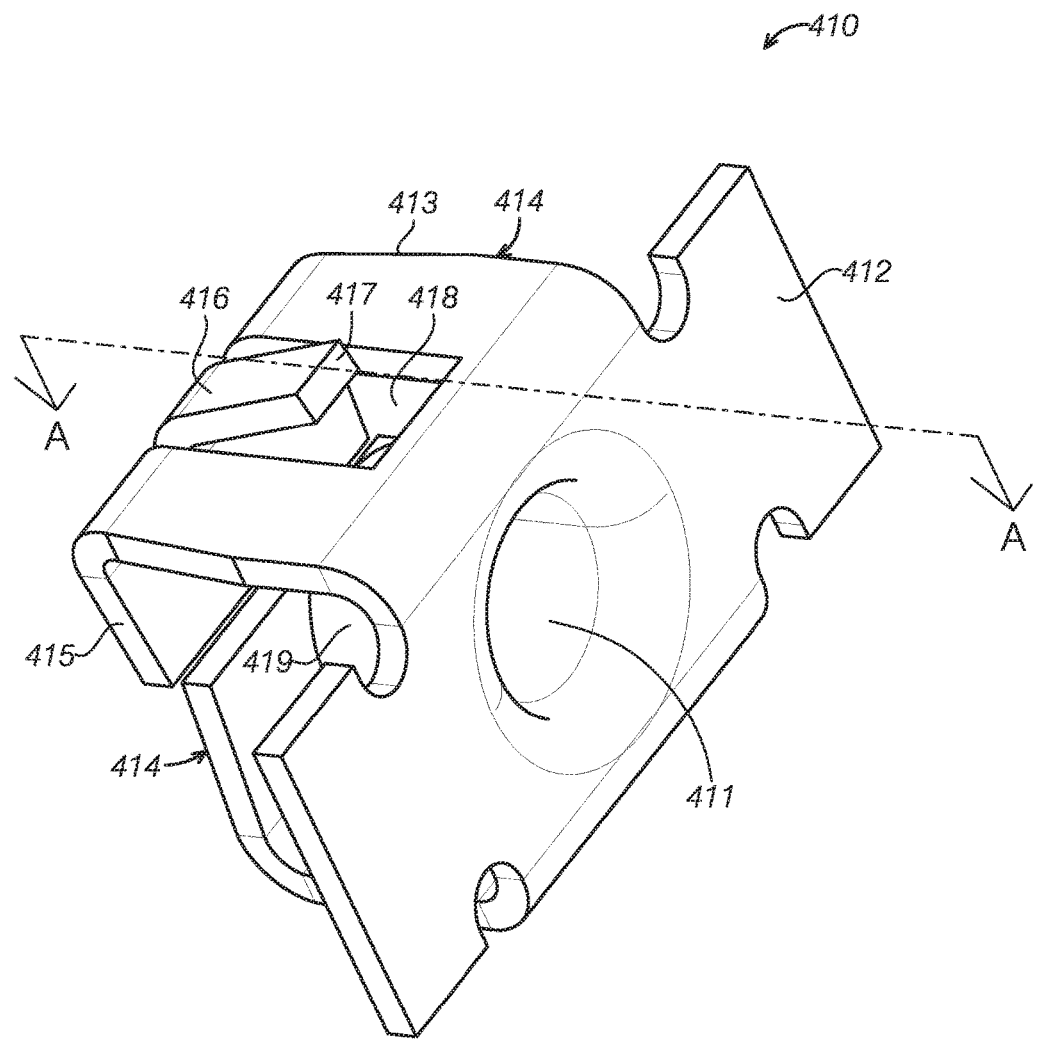
FIG. 4 is a perspective view of a fixed element of a fastener assembly according to another embodiment of the present disclosure.
Figure 5A:
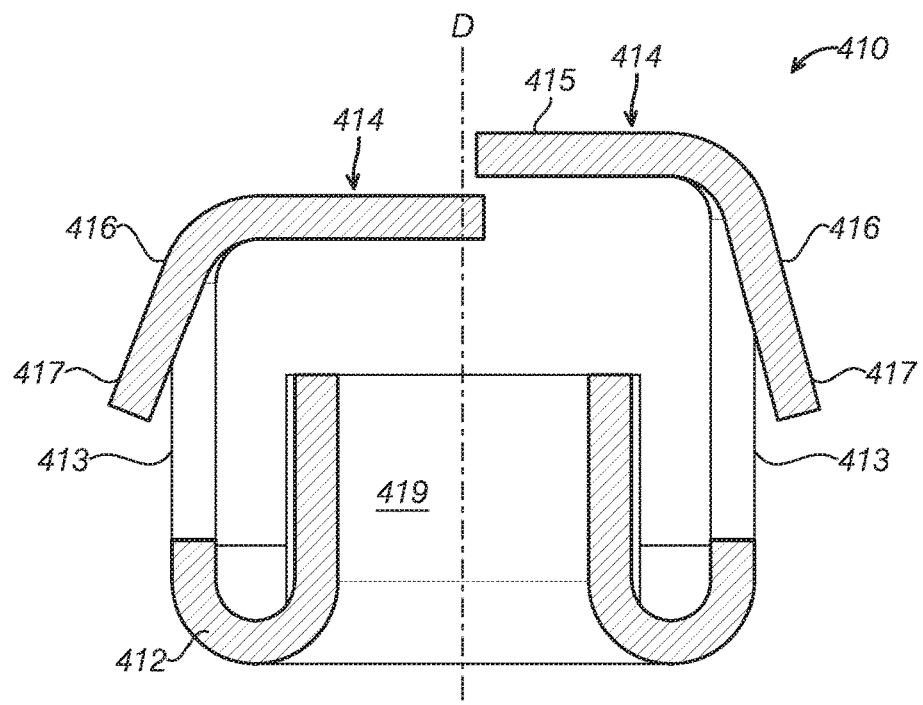
FIG. 5A is a cross-sectional view of the fixed element of the fastener assembly in FIG. 4 along line A-A.

FIG. 4 illustrates a fixed element 410 of a fastener assembly according to another embodiment of the present disclosure, FIG. 5A is a cross-sectional view of the fixed element 410 along line A-A. The fixed element 410 includes a base panel 412 having a through hole 411 and a plurality of engaging parts 414 extending from the outer peripheral of the through hole 411 on the base panel 412. The engaging parts 414 may be formed from flexible sheets which is deformable and has an upright portion 413 extending from the base panel 412 and a free portion 415 bending from the upright portion 413 towards a central axis D of the through hole 411.

In some embodiments, as shown in FIGS. 4 and 5A, in a normal state, two free portions 415 of the two engaging parts 414 may at least overlap partially with each other. In some embodiments, in the normal state, a distance between the two free portions 415 of the two engaging parts 414 is smaller then a smallest outer diameter of a engaging part of the movable element. In this way, once the fastener assembly is assembled, the engaging parts 414 rest against the movable element by a biasing force, such that the engagement between the engaging parts 414 and the movable element may be robust and more stable. It should be appreciated that the "normal state" mentioned in the present disclosure may refer to that the corresponding part is in a state not subjecting to an external force, or in a state where an external force applied on the corresponding part has been removed.

In some embodiments, as shown in FIG. 5A, the fixed element 410 includes two engaging parts 414. In the normal state, two free portions 415 of the two engaging parts 414 are not aligned with each other in a longitudinal direction of the fixed element Y. In other words, one engaging part is positioned above the other one engaging part. In some embodiments, two free portions 415 of the two engaging parts 414 are aligned in the direction Y or contact with each other. Alternatively, the distance between the two free portions 415 of the two engaging parts 414 is smaller than a smallest outer diameter of an engaging portion of the movable element.

In some embodiments, each engaging part 414 includes a flexible support 416 having a free end 417. As shown in FIGS. 3-5, a largest distance of projections of two free ends 417 in a plane parallel with the base panel 412 or the sheet metal 230 may be larger than a diameter of the mounting hole 232 in the sheet metal 230. The flexible support 416 is configured to deform flexibly such that the engaging parts 414 of the fixed element 410 are allowed to pass through the mounting hole 232 in the sheet metal 230 and then the free ends 417 tend to return to the normal state after passing through the mounting hole 232, and in this way the fixed element is retained in the mounting hole in the sheet metal and will not release from the sheet metal. The "normal state" of the flexible support may refer to that the flexible support is in a state that no external force is applied on the flexible support or an external force has been removed from the flexible support.

In some embodiments, the flexible support 416 may be fixed on an outer wall of the engaging part 414, the free end 417 of the flexible support 416 may extend away from the outer wall of the engaging part 414 and towards the base panel 412. When assembling the fixed element 410 to the sheet metal 230, each flexible support 416 may deform to bend towards an outer wall of the upright portion 413 and to move towards a central axis D of the through hole 411, such that the fixed element 410 may pass through the mounting hole 232 in the sheet metal 230. After the fixed element 410 has been retained in the sheet metal 230, the free ends 417 of the flexible supports 416 return to normal state. Because the maximum distance of projections of the two free ends of the flexible supports in a plane parallel to the sheet metal 230 is larger than the diameter of the mounting hole 232 in the sheet metal 230, the fixed element 410 is retained on the sheet metal 230 and will not be released. In some embodiments, the free ends 417 of the flexible supports 416 is configured to contact surface of the sheet metal 230 after passing through the mounting hole 232 in the sheet metal 230. In other words, the free ends 417 of the flexible supports 416 may rest upon the surface of the base panel 412 after being mounted on the sheet metal 230 to further secure the fixed element 410 on the sheet metal 230 stably.

In some embodiments, as shown in FIGS. 4 and 5A, the flexible support 416 has a first end fixed to an outer side of the upright portion 413 of the engaging part 414 and a second end or a free end 417 extending away from the upright portion 413. The free end 417 is configured to deform to move towards the upright portion 413, thus allowing the engaging parts 414 to pass through the mounting hole 232 in the sheet metal 232 during the mounting process. And then the free ends 417 return to its normal state to expand outwards, thus retaining the fixed element 410 on the sheet metal 230.

Figure 5B:
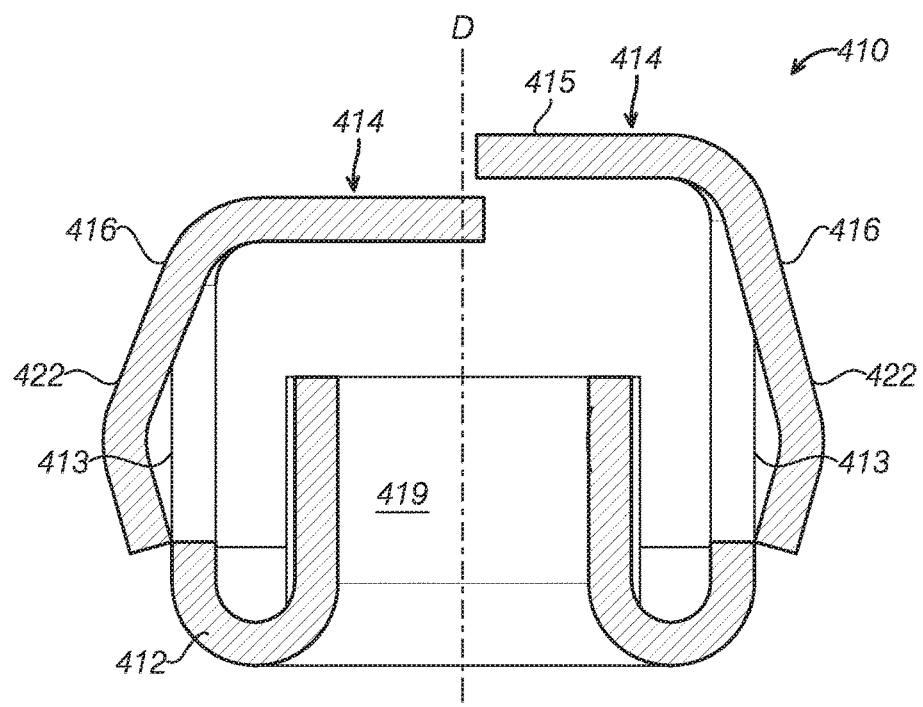
FIG. 5B is a cross-sectional view of a fixed element of a fastener assembly according to another embodiment of the present disclosure.

In some embodiments, as shown in FIG. 5B, the flexible support 416 has two ends fixed with the upright portion 413 and a flexible middle part 422 connected between the two ends. The maximum distance of projections of two flexible supports 416 of the engaging parts 414 in a plane parallel with the base panel 412 or the sheet metal 230 is larger than the diameter of the mounting hole 232 in the sheet metal 230. The flexible supports 422 is configured to deform to move towards the upright portion 413 during the mounting process to allow the engaging parts 414 of the fixed element 410 to pass through the mounting hole 230. And then the flexible supports 422 return to its normal state to expand outwards toretain the fixed element 410 on the sheet metal 230.

In some embodiments, as shown in FIGS. 4, 5A, and 5B, the upright portion 413 of the engaging part 414 may contain a through hole 418 with one side connected with an end of the flexible support 416. In the normal state, the free end 417 extends away from the engaging part 414 and towards the base panel 412.

In some embodiments, as shown in FIGS. 4, 5A, and 5B, the fixed element 410 includes a sleeve part 419 extending around the through hole 411 on the surface of the base panel 412. The sleeve part 419 may receive at least a portion of the movable element 420 to prevent the movable element 420 from shaking or swaying, thus further enhance the stability of the fastending assembly.

In some embodiments, the fixed element 410 may be made from metal and integrally formed for easy and inexpensive manufacturing.

Figure 6:
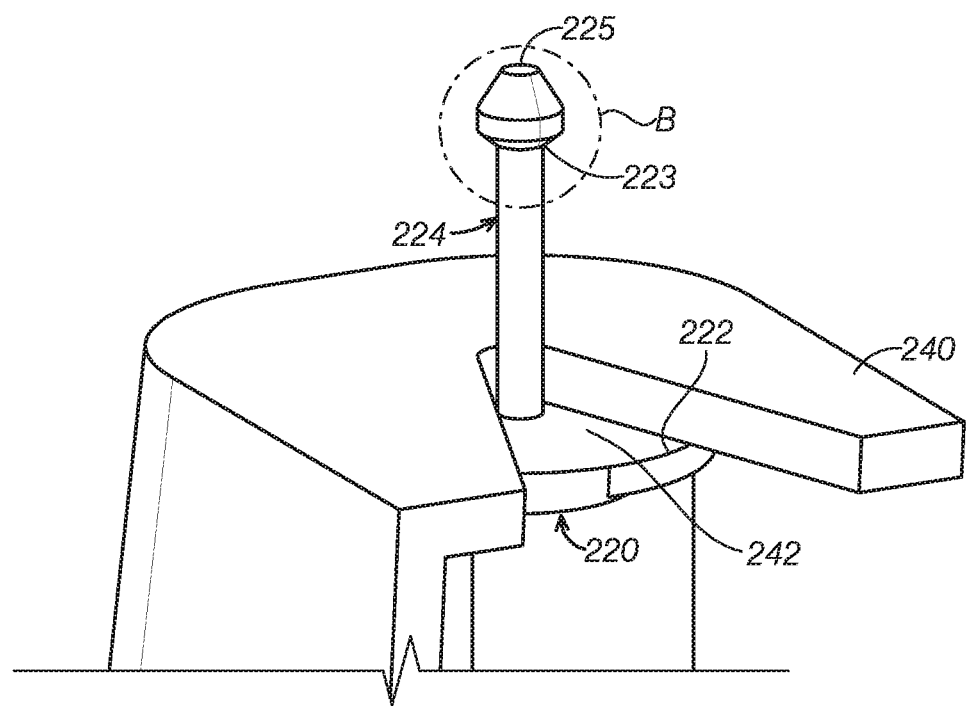
FIG. 6 is a perspective view of a movable element of the fastener assembly in FIG. 2, illustrating a connection between the movable element and the interior trim part.

FIG. 6 illustrates a movable element 220 premounted on an interior trim part 240. With reference to FIGS. 2 and 6, the movable element 220 may include a flange 222 and an engaging shaft 224 extending from a surface of the flange 222. The engaging shaft 224 may include a shaft body 223 and a head 225 on the shaft body 223. The head 225 has a diameter larger than that of the shaft body 223. In some embodiments, the flange 222 rests against a lower surface of the interior trim part 240 to be premounted on the interior trim part 240. During the mounting process, the engaging shaft 224 passes through a mounting hole 242 in the interior trim part 240, the through hole 211 in the fixed element 210, and the mounting hole 232 in the sheet metal 230 sequentially to be engaged with the engaging parts 214 of the fixed element 210, thus fixing the interior trim part 240 on the sheet metal 230. In some embodiments, the mounting hole 242 of the interior trim part 240 may have an side opening. For example, the mounting hole 242 may be a open recess in the interior trim part 240.

In some embodiments, as shown in FIG. 6, the flange 222 of the movable element 220 may have a cross-section of a polygon, such as rectangle, trapezoid, a shape defined by arcs and straight lines, or any combinations thereof. In some embodiments, the flange 222 of movable part 220 has a tool recess on a surface opposite to the engaging shaft 224, such as a cross recess. In some embodiments, the flange 222 of the movable element 220 has a protrusion on the surface opposite to the engaging shaft 224. In this way, an external rotation, push, or pull force may be applied to the movable element 220 via the cross recess or protrusion, thus facilitating the assemble or replacement of the fastener assembly 200.

In some embodiments, as shown in FIGS. 2 and 6, the diameter of the head 225 of the engaging shaft 224 increases gradually from top to bottom. In other words, the head 225 may be a cone or truncated cone. During the mounting process of the movable element 220, it is easy for the head 225 of the moveable element 220 to pass through the free ends 415 of engaging parts 414 of the fixed elements 210 and to engage with the fixed element, i.e., forming secured connection. During the removal of the movable element 220, it is easy for the head 225 to release from the engagement with the engaging parts 414, thus facilitating the removal.

Figure 7:
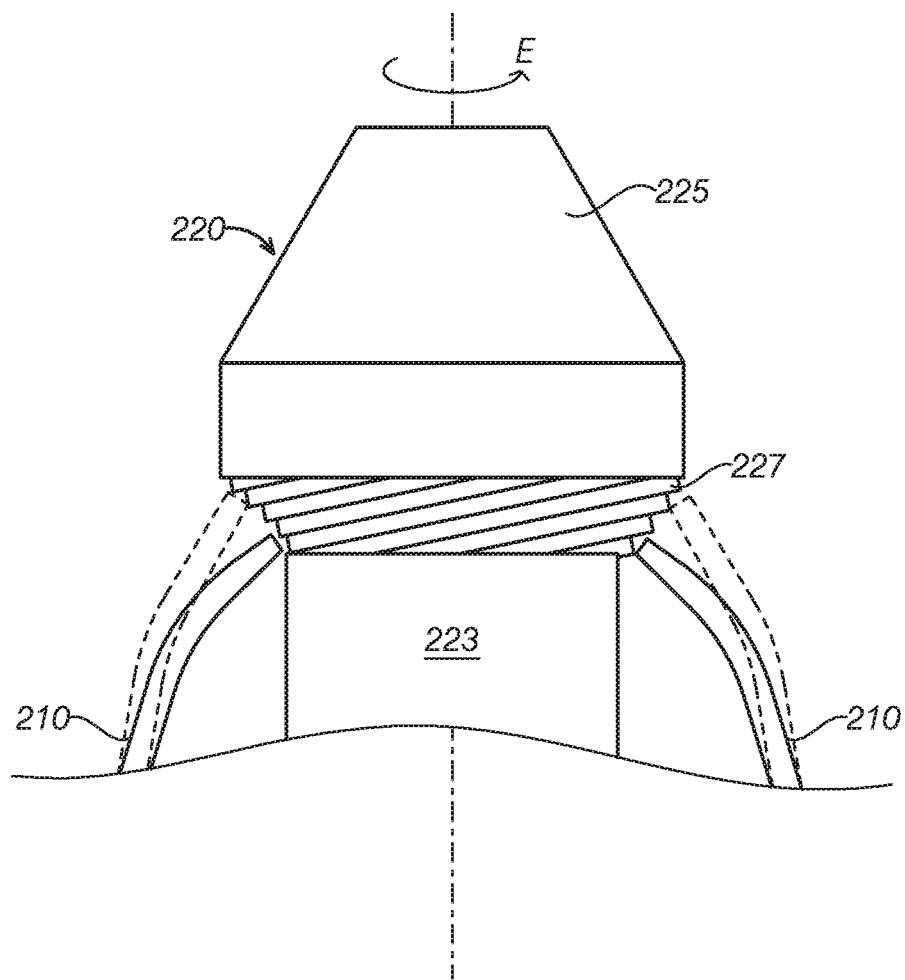
FIG. 7 is an enlarged view of a movable element B of the fastener assembly in FIG. 6.

FIG. 7 is an enlarged view of part B of the movable element 220 in FIG. 6. The part B includes the head 225 and an upper end portion of the shaft body 223. FIG. 7 illustrates a state of engagement between the engaging shaft 224 and the engaging parts 210 and a state of disengagement or unlocking between the engaging shaft 224 and the engaging parts 210 (shown in dashed lines). As shown in FIG. 7, the engaging shaft 224 includes a guiding part 227 disposed between the head 225 and the shaft body 223. The guiding part 227 has a diameter decreases gradually from the head 223 to the bottom, and has inclined guiding grooves on an outer pheripheral thereof. For example, the largest diameter of the guiding part 227 may be substantially equal to a diameter of a bottom surface of the head 225, while the smallest diameter of the guiding part 227 may be substantially equal to a diameter of a top surface of the shaft body 223. In a fastened position, the engaged parts 210 are engaged at a lower portion of the guiding part 227, and the free ends of the engaging parts 210 are retained in the guiding grooves of the guiding part 227 to lock with the movable element.

In some embodiments, the guiding part 227 may be configured as inclined threaded sections extending along an outer peripheral of the guiding part 227, such as the inclined threaded sections shown in FIG. 7. In some embodiments, the guiding part 227 may be configured as another structure having inclined guiding grooves. For example, in another embodiment, the number of the guiding grooves is smaller while the distance between two adjacent guiding grooves is smaller relative to those shown in FIG. 7.

With reference to FIGS. 2 and 7, during the release process of the movable element 220 from the fixed element 210, the flange 222 may be rotated to allow the movable element 220 to rotate about its central axis (for example, rotating along direction E). Free ends of the engaging parts 210 may move upwards along the inclined guiding groove of the guiding part 227 while deforming to expand outwards, and finally to the upper end of the guiding part 227 to rest against the bottom of the head 225 (as shown in dashed lines in FIG. 7). In this way, the engagement between the engaging parts 214 and the guiding part 227 has been released, and the movable element 220 can be removed from the fixed element 210 by an external downward force. In this way, the interior trim part 240 may be removed from the sheet metal 230 conveniently.

Figure 8:
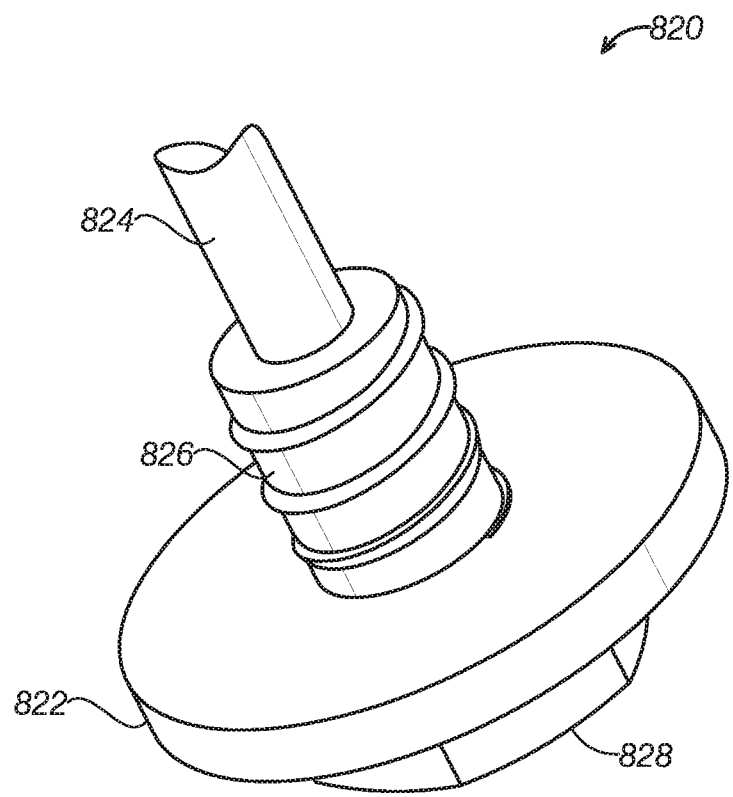
FIG. 8 is a perspective view of a part of a movable element of a fastener assembly according to another embodiment of the present disclosure.

FIG. 8 illustrates a part of a movable element 820 of a fastener assembly according to another embodiment of the present disclosure. The movable element 820 may include a flange 822 and an engaging shaft 824 extending from a surface of the flange 822. In some embodiments, as shown in FIG. 8, the movable part 820 further includes a threaded section 826 disposed between the engaging shaft 824 and the flange 822. The mounting hole in the interior trim part of the vehicle is constructed as a threaded hole or other threaded part to engage with the threaded section 826. During a process of removing the movable element 820, the threaded section 826 on the movable element 820 operates with the threaded hole in the interior trim part to provide a downward force on the movable element 820 as the movable element 820 rotates, which facilitates the engaging parts to move to the upper portion of the guiding part, thus facilitating the disengagement of the movable element 820 from the fixed element.

In some embodiments, the fixed element may be integrally formed from metal.

Figure 9:
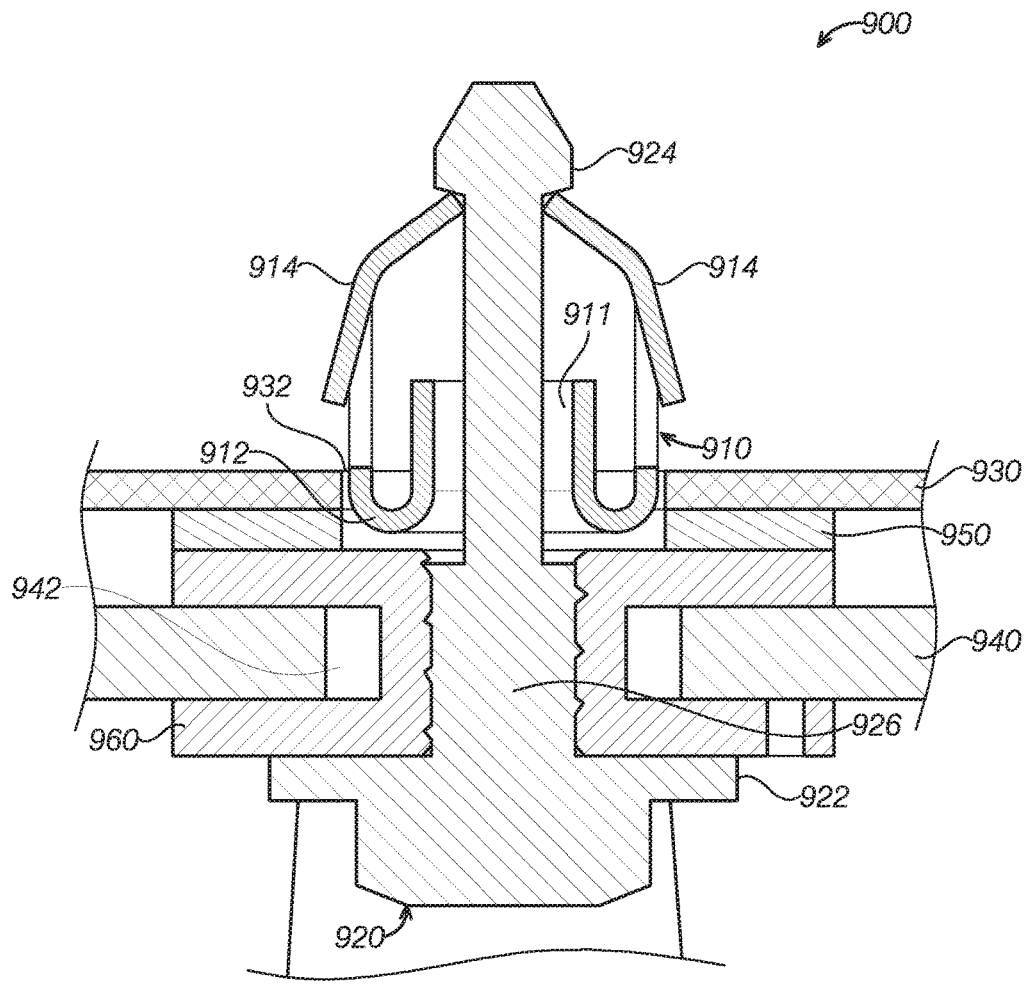
FIG. 9 is a cross-sectional view of a fastener assembly according to another embodiment of the present disclosure, illustrating a connection between the fastener assembly and a sheet metal and an interior trim part.

FIG. 9 is a cross-sectional view of a fastener assembly 900 according to an embodiment of the present disclosure. For the sake of brevity, elements with a same or similar structure with those described above will not be described herein. The fastener assembly 900 may include a fixed element 910 and a movable element 920. The fixed element 910 includes a base panel 912 having a through hole 911 and a plurality of engaging parts 914 disposed around the through hole 911 on a surface of the base panel 912. The engaging part 914 extends from the surface of the base panel 912 and is deformable to bend towards or away from a central axis of the through hole 911. The engaging parts 914 are configured to pass through a mounting hole 932 formed in sheet metal 930 of the vehicle so as to be retained on the sheet metal 930. The movable element 920 has at least one flange 922 and an engaging shaft 924 extending from a surface of the flange 922. The engaging shaft 924 of the moveable element 920 is configured to pass through a mounting hole 942 in an interior trim part 940, the through hole 911 in the fixed element 910, the mounting hole 932 in the sheet metal 930, and free ends of the engaging pans 914 sequentially to be engaged or locked with the engaging parts 914 of the fixed element 910.

In some embodiments, as shown in FIG. 9, the fastener assembly may include a gasket 950 disposed between the interior trim part 940 and the base panel 912 of the fixed element 910. The gasket 950 may contain elastic material to offset a gap between the sheet metal 930 and the interior trim part 940, thus further enhancing the engagement or connection therebetween.

In some embodiments, as shown in FIG. 9, the mounting hole 942 of the interior trim part 940 may have a side opening. For example, the mounting hole 942 may be a open recess. The fastener assembly 900 may have a connection part 960 disposed on the mounting hole 942 of the interior trim part 940. The connection part 960 may have two flanges opposite to each other, a connection shaft connected between the two flanges, and a threaded hole extending through the connection shaft. The connection shaft of the connection part 960 may pass via the mounting hole 942 in the interior trim part 940 to be inserted laterally into the mounting hole 942 while the two flanges form a snap fit with the interior trim part 940. In this way, the connection part 960 is fixed on the interior trim part 940 stably. In addition, the movable element 920 may further include a threaded section 926 disposed between the connection shaft 924 and the flange 922.

In some embodiments, the connection part 960 may be integrally formed in the interior trim part 940. In this way, the manufacturing process of the fastener assembly can be further simplified and the manufacturing cost can be lowered. In some embodiments, the connection part 960 may be premounted on the movable element 920 or interior trim part 940, which may simplify the delivery and assemble processes of the interior trim part.

During disassemble of the fastener assembly, as the movable element 920 is rotated, the threaded hole in the interior trim part 940 or connection part 960 may engage with the threaded section 926 of the movable element 920, which provide a downward force on the movable element 920 to further facilitate the release of the movable element 920 from the fixed element 910. In this way, it is convenient to remove the fastener assembly 900.

It should be appreciated that, for the sake of brevity, other elements of the fastener assembly 900 may refer to those described in the above embodiments, and details will not be described herein.

Figure 10:
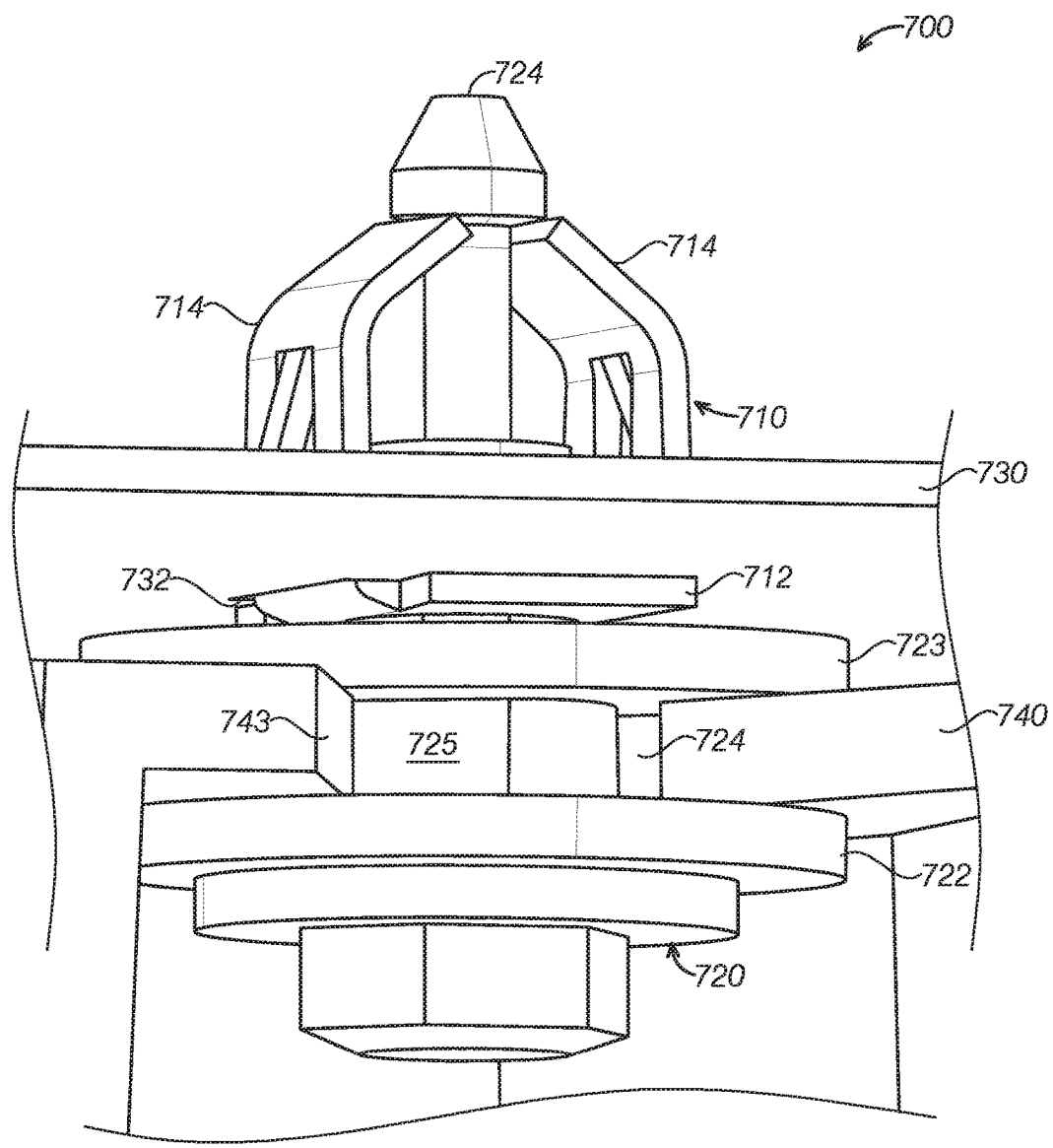
FIG. 10 is a perspective view of a fastener assembly according to another embodiment of the present disclosure, illustrating a connection between the fastener assembly and a sheet metal and an interior trim part.

FIG. 10 is a perspective view of a fastener assembly 700 according to another embodiment of the present disclosure. The fastener assembly 700 includes a fixed element 710 and a movable element 720. The fixed element 710 includes a base panel 712 having a through hole and a plurality of engaging parts 714 disposed around the through hole on a surface of the base panel 712. The engaging part 714 extends from the surface of the base panel 712 and may deform to bend towards or away from a central axis from the through hole. The engaging parts 714 are configured to pass through a mounting hole 732 formed in a metal sheet 730 to be retained on the sheet metal 730.

In some embodiments, as shown in FIG. 10, the movable element 720 contains two opposite flanges such as a first flange 722 and a second flange 723, a connection shaft 725 connected between the first and second flanges 722, 723, and an engaging shaft 724 extending from a surface of the second flange 723. The movable element 720 is configured to pass through the mounting hole 724 in the interior trim part 740, the through hole in the fixed element 710, the mounting hole 732 in the sheet metal 730, and free ends of the engaging parts 714, and finally to lock or engage with the engaging parts 714 of the fixed element. The mounting hole 724 of the interior trim part 740 may be open at one side, or alternatively has an open side 743. In other words, the mounting hole 724 may be an open recess. The movable element 720 may be inserted in the mounting hole 724 via the open side 743 and then retained in the interior trim part 740.

During disassembling of the fastener assembly, as the movable element 720 is rotated, the engaging parts 714 of the fixed element 710 may be released from the engagement with the engaging shaft 724 of the movable element 720. Then, when a downward force is applied on the movable element 720 via the interior trim part 740, the interior trim part 740 together with the movable elements 720 can be pulled away from the sheet metal 730. In this way, it is convenient to remove the fastening assemly.

It should appreciated that, for the sake of brevity, other elements of the fastener assembly 700 may refer to those described in the above embodiments, and details will not be described herein.

As described above, the fastener assembly for an interior trim part in a vehicle of the present disclosure can be formed integrally, have a simple structure, and have a low manufacturing cost. In addition, the fastener assembly can form a strong and reliable engagement between the interior trim part and the vehicle body. The fastener assembly is easily assembled and released for maintenance and replacement. Further, parts of the fastener assembly can be premounted on the interior trim part, which facilities the transportation and assembly of the vehicle.

The fastener assembly of the present disclosure may be used in a passenger vehicle, a commercial vehicle, or various other vehicles, such as agriculture machines, transportation ships, or airplanes. Those applications should be considered as included in the scope of term "vehicle" cited in this disclosure.

It should be appreciated that the embodiments described above are specific examples that do not encompass all possible forms of the disclosure. The features of the illustrated embodiments may be combined to form additional or alternative embodiments of the disclosed concepts. The words used in the specification are words of description rather than limitation, and it is understood that changes can be made without departing from the spirit and scope of the disclosure. The scope of the following claims is broader than the specifically disclosed embodiments and includes modifications of the illustrated embodiments.

The invention claimed is:

1. A fastener assembly for an interior trim part in a vehicle, comprising:
    a fixed element, wherein the fixed element includes a base panel with a through hole and a plurality of engaging parts extending from a surface of the base panel, the engaging parts are flexible to deform towards or away from a central axis of the through hole; and
    a movable element including a flange and an engaging shaft extending from a surface of the flange,
    wherein the engaging shaft passes through the through hole of the fixed element to be engaged with the engaging parts at a fixed position,
    wherein the engaging shaft comprises a guiding part configured to be engaged with the engaging parts of the fixed element at the fixed position, and to guide the engaging parts to move to be released from the engaging shaft when the movable element rotates about a central axis thereof along a first direction,
    wherein the engaging shaft further comprises a shaft body extending from the surface of the base panel and a head on the shaft body, and the head has a diameter larger than that of the shaft body, wherein the guiding part is disposed between the shaft body and the head and a diameter of the guide part is gradually decreased in a direction from the head to the shaft body and has a guiding groove, and wherein the engaging parts are engaged with a lower end of the guiding part at the fixed position, and wherein the engaging parts are guided by the guiding groove to move to an upper end of the guiding part as the movable element rotates such that the engaging parts are released from the engaging shaft.

2. The fastener assembly of claim 1, wherein the guiding part has an inclined threaded section with grooves extending along its exterior peripheral.

3. The fastener assembly of claim 1, wherein the engaging parts are formed with flexible metal sheets.

4. The fastener assembly of claim 1, wherein each of the engaging parts has an upright portion extending substantially perpendicularly from the surface of the base panel and a free portion extending from the upright portion towards the central axis of through hole of the base panel.

5. The fastener assembly of claim 4, wherein at least two of the engaging parts have two free portions overlapped with each other in a normal state of the fixed element.

6. The fastener assembly of claim 4, wherein at least two of the engaging parts have two free portions with a distance therebetween smaller than a smallest outer diameter of the engaging shaft.

7. The fastener assembly of claim 1, wherein the head of the engaging shaft has a cone or truncated cone shape.

8. The fastener assembly of claim 1, wherein the fixed element is made from metal and is integrally formed and wherein the movable element is made from metal and integrally formed.

9. A fastener assembly for connecting an interior trim part of a vehicle to a sheet metal of the vehicle, comprising:
a fixed element including a base panel having a through hole and a plurality of engaging parts extending from an outer peripheral of the through hole on the base panel, wherein the engaging parts are configured to pass through a mounting hole formed in the sheet metal to be retained on the sheet metal and are flexible to bend towards or away from a central axis of the through hole, and the fixed element is pre-mounted on the sheet metal; and
a movable element having at least a flange and an engaging shaft extending from a surface of the flange, wherein the engaging shaft is configured to pass through a mounting hole in the interior trim part, a through hole in the fixed element, the through hole in the sheet metal sequentially to be engaged with the engaging parts at a fixed position.

10. The fastener assembly of claim 9, wherein the engaging shaft comprises a guiding part configured to be engaged with the engaging parts of the fixed element at the fixed position, and guide movement of the engaging parts such that the engaging parts are released from an engagement with the engaging shaft as the movable element rotates about a central axis.

11. The fastener assembly of claim 10, wherein the engaging shaft further comprising
a shaft body extending from the surface of the base panel, and
a head above the shaft body, wherein the head has a diameter larger than that of the shaft body;
wherein the guiding part is disposed between the shaft body and the head, has a diameter gradually decreased in a direction from the head to the shaft body, and has an inclined groove on an outer peripheral thereof; wherein the inclined groove is configured to lock the engaging parts at a lower end thereof at the fixed position, and to guide the engaging parts to move to an upper end thereof to release the engaging parts from an engagement with the moveable element as the movable element rotates.

12. The fastener assembly of claim 9, wherein each of the engaging parts comprises an upright portion extending substantially perpendicularly from the surface of the base panel, a free portion extending from the upright portion towards the central axis of the through hole in the base panel, and a flexible support fixed on an outer wall of the upright portion; wherein the flexible support is configured to deform to allow the engaging parts of the fixed element to pass through the mounting hole in the metal sheet and to return to a normal state after the engaging parts has passed through the mounting hole, such that the fixed element is retained on the sheet metal.

13. The fastener assembly of claim 12, wherein the flexible support has a first end connected with the outer wall of the upright portion and a second end extend away from the upright portion, wherein the second end of the flexible support is configured to bend towards the upright portion to allow the engaging parts to pass through the mounting hole and to return to the normal state to retain the fixed element on the sheet metal after the passing.

14. The fastener assembly of claim 13, wherein the second end of the flexible support rests against a surface of the sheet metal at the fixed position.

15. The fastener assembly of claim 12, wherein the flexible support has two ends connected with the outer wall of the upright portion and a flexible connection section between the two ends; wherein the connection section is configured to bend towards the upright portion to allow the engaging parts of the fixed elements to pass through the mounting hole in the sheet metal, and to return to the normal state to retain the fixed element in the mounting hole of the sheet metal.

16. The fastener assembly of claim 9, wherein the fixed element includes a sleeve part disposed around a peripheral of the through hole and extending from the surface of the base panel at a certain distance, wherein the engaging shaft of the moveable element is partially received in the sleeve part.

17. The fastener assembly of claim 9, wherein the flange comprises a first flange adjacent to the engaging shaft, a second flange opposite to the first flange, and a connection shaft connected between the first and second flanges, wherein the engaging shaft extends from an upper surface of the first flange, wherein the mounting hole in the interior trim part has an opening at a side thereof; and
wherein the connection shaft is configured to be assembled in the mounting hole of the interior trim part via the opening, and the interior trim part is fixed between the first and second flanges via interference fit.

18. The fastener assembly of claim 9, wherein the movable element further comprises a threaded section disposed between the engaging shaft and the flange, the mounting hole of the interior trim part has a threaded hole portion corresponding with the threaded section, the threaded section is received in the threaded hole section at the fixed position, and the movements between the threaded section and the threaded hole section provide a downward force to facilitate the disengagement of the engaging shaft and the engaging parts as the movable element rotates about a central axis thereof.

19. A fastener assembly for an interior trim part to a metal sheet in a vehicle, comprising:
a fixed element, wherein the fixed element includes a base panel with a through hole and a plurality of engaging parts extending from a surface of the base panel, and the engaging parts are flexible to deform towards or away from a central axis of the through hole; and a movable element including a flange and an engaging shaft extending from a surface of the flange, wherein the engaging shaft passes through the through hole of the fixed element to be engaged with the engaging parts at a fixed position, wherein each of the engaging parts comprises an upright portion extending substantially perpendicularly from the surface of the base panel, a free portion extending from the upright portion towards the central axis of the through hole in the base panel, and a flexible support fixed on an outer wall of the upright portion; and wherein the flexible support is configured to deform to allow the engaging parts of the fixed element to pass through the mounting hole in the metal sheet and to return to a normal state after the engaging parts has passed through the mounting hole, such that the fixed element is pre-mounted on the sheet metal.

20. The fastener assembly of claim 19, wherein the flexible support has a first end connected with the outer wall of the upright portion and a second end extend away from the upright portion, wherein the second end of the flexible support is configured to bend towards the upright portion to allow the engaging parts to pass through the mounting hole and to return to the normal state to retain the fixed element on the sheet metal after the passing.

* * * * *